(12) United States Patent
Larha

(10) Patent No.: US 9,894,091 B1
(45) Date of Patent: Feb. 13, 2018

(54) NETWORK WITH INTELLIGENT NETWORK JACK

(71) Applicant: AMAZON TECHNOLOGIES, INC., Seattle, WA (US)

(72) Inventor: Rajdeep Larha, Sammamish, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 94 days.

(21) Appl. No.: 14/972,892

(22) Filed: Dec. 17, 2015

(51) Int. Cl.
*H04L 29/06* (2006.01)
*H04L 12/24* (2006.01)
*H04L 12/26* (2006.01)
*G06F 11/30* (2006.01)

(52) U.S. Cl.
CPC ...... *H04L 63/1433* (2013.01); *G06F 11/3051* (2013.01); *H04L 41/0631* (2013.01); *H04L 43/0811* (2013.01); *H04L 63/0853* (2013.01); *H04L 63/0876* (2013.01)

(58) Field of Classification Search
CPC ............... H04L 63/1433; H04L 41/063; H04L 43/0811; H04L 63/0853; H04L 63/0876; G06F 11/3051
See application file for complete search history.

(56) References Cited

U.S. PATENT DOCUMENTS

| | | | |
|---|---|---|---|
| 8,827,748 B2 | 9/2014 | Scherer et al. | |
| 8,952,707 B2 * | 2/2015 | Hashim | G01R 31/043 324/647 |
| 2005/0141431 A1 * | 6/2005 | Caveney | H04L 41/00 370/241 |
| 2008/0049627 A1 * | 2/2008 | Nordin | H04L 41/12 370/241 |
| 2009/0265318 A1 * | 10/2009 | Vermeulen | H04L 41/00 |
| 2010/0031032 A1 * | 2/2010 | Ametsitsi | H04L 67/18 713/159 |
| 2010/0120264 A1 * | 5/2010 | Caveney | H04Q 1/136 439/49 |
| 2010/0210134 A1 * | 8/2010 | Caveney | H04Q 1/149 439/490 |
| 2011/0015795 A1 * | 1/2011 | Boyer | G06F 1/266 700/286 |
| 2011/0043371 A1 * | 2/2011 | German | H04Q 1/136 340/815.45 |
| 2011/0189886 A1 * | 8/2011 | Chen | H04Q 1/13 439/488 |
| 2012/0185919 A1 * | 7/2012 | Macauley | H04Q 1/138 726/3 |
| 2013/0078848 A1 * | 3/2013 | Kummetz | H04Q 1/138 439/488 |
| 2013/0217249 A1 * | 8/2013 | Patel | H01R 13/516 439/188 |
| 2013/0241313 A1 * | 9/2013 | Chirgwin | H01H 47/00 307/113 |

(Continued)

*Primary Examiner* — Techane Gergiso
(74) *Attorney, Agent, or Firm* — Lindauer Law, PLLC

(57) ABSTRACT

An intelligent jack provides a physical port identifier (PPID) to an upstream device, such as a network switch. The network switch receives the PPID on a particular physical port. The network switch accesses port configuration data to configure the particular physical port, such as to a particular virtual local area network (VLAN). Port connection data associating the physical port with the PPID may be generated. Changes to the port connection data may generate an alarm.

20 Claims, 8 Drawing Sheets

(56) References Cited

U.S. PATENT DOCUMENTS

| | | | |
|---|---|---|---|
| 2013/0329344 A1* | 12/2013 | Tucker | H02B 15/00 361/633 |
| 2014/0184238 A1* | 7/2014 | Yossef | H04L 43/00 324/538 |
| 2015/0056832 A1* | 2/2015 | Fransen | H01R 13/518 439/153 |
| 2015/0312738 A1* | 10/2015 | Deich | H04W 4/22 370/328 |
| 2016/0088374 A1* | 3/2016 | Coffey | G02B 6/43 398/28 |

* cited by examiner

PORT CONNECTION DATA 120

| RECEIVED JACK IDENTIFIER 202 | PHYSICAL PORT IDENTIFIER 204 | CONNECT TIME 206 | ESTIMATED CABLE DISTANCE 208 |
|---|---|---|---|
| 6B61656C616E | 1 | 2015112711012 | 31 |
| 746965726E616E | 3 | 2015112608910 | 77 |
| 616D6172697365 | 6 | 2015111071619 | 29 |
| 737072696E6B6C | 5 | 2015112711012 | 43 |
| 656C697A6F6E646F | 4 | 2015112715387 | 57 |

...

PORT CONFIGURATION DATA 122

| JACK IDENTIFIER 152 | ASSIGNED VLAN 210 | SECURITY LEVEL(S) 212 |
|---|---|---|
| 6B61656C616E | 1 | 3, CLEAR |
| 746965726E616E | 3 | 3, CLEAR |
| 616D6172697365 | 6 | 3, CLEAR |
| 737072696E6B6C | 5 | 1, ENCRYPT |
| 656C697A6F6E646F | 4 | 1, ENCRYPT |

...

MANAGEMENT DATA 124

| NETWORK HOSTNAME 214 | NETWORK MANAGEMENT ADDRESS 216 |
|---|---|
| dev1.example.com | 10.0.20.100 |

...

FIG. 2 ers, optical fibers, waveguides, and so forth that are deployed within a facility to provide connectivity to connected devices. For example, the structured cabling may include Category 6 cable that is compliant with the Telecommunications Industry Association specification ANSI/TIA-568-C.1.

The structured cabling may terminate a first endpoint at a wall jack located at a particular location in the facility. For example, a first endpoint of the Category 6 cabling may be terminated in an eight position eight contact (8P8C) or "RJ-45" wall jack in a conference room. Several cables may be run to the same approximate location. For example, the conference room may have four cables installed, each running to a respective wall jack. During use, a connected device such as a laptop, workstation, or other computing device, may be connected to the jack using a patch cable. Continuing the example, the patch cable may comprise a short length of Category 6 cabling that is terminated at each end with an eight position eight contact (8P8C) compliant plug.

Each of the cables in the structured cabling may be run to a distribution frame. At the distribution frame a second endpoint of the cable may be terminated at a patch panel that includes patch jacks. For example, each of the cables may be terminated to a particular patch jack.

At the distribution frame patch cables may be used to connect a particular patch jack to a particular physical port on a network device. For example, patch cables may be used to connect a particular patch jack to an Ethernet switch (switch). The switch provides for the transport of packets between the different physical ports. For example, the switch may be configured to allow an exchange of traffic between physical ports 1 and 2.

The network device may be configurable to control what physical ports are allowed to communicate with one another or particular devices. For example, the switch may be configured to support a first virtual local area network (VLAN) and a second VLAN. Physical ports configured to use the first VLAN may be permitted to intercommunicate, while preventing communication with physical ports of the second VLAN. By using VLANs or other network segmentation techniques, a network administrator may be able to provide for different types of access using the same physical hardware. For example, the first VLAN may be a "corporate" network used by the employees of a business, while the second VLAN may be a "guest" network. Servers or other network resources used to operate the business may be assigned to use the first VLAN. The second VLAN, in comparison, may be limited to providing access to the internet, limit communication to particular devices such as printers, and so forth.

During setup and ongoing use of a facility, the interconnections between the patch jack and the physical port may change. For example, employees from a branch office may visit the facility and may be setup to work in the conference room. To provide them with access to the corporate network, someone may move the patch cables such that the patch jacks (that connect to the wall jacks in the conference room) are moved from physical ports on the switch that are configured for the "guest" VLAN to those physical ports configured for the "corporate" VLAN. Later, the conference room may be re-tasked for guests. Unless those patch cables are restored or the switch is reconfigured, the jacks are unintentionally providing "corporate" VLAN access when "guest" VLAN access may be more secure. This may result in exposure of a security vulnerability. This also provides an

NETWORK WITH INTELLIGENT NETWORK JACK

BACKGROUND

Computer networks may use structured cabling to exchange signals. The structured cabling may include wires, optical fibers, waveguides, and so forth that are deployed within a facility to provide connectivity to connected devices. The structured cabling may terminate at an endpoint, such as a jack, at a particular location in the facility. It is possible for a jack to be incorrectly connected to a device such as a switch, such that the jack provides connectivity to a network other than that desired. As a result, a potential security vulnerability may be exposed.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIG. 2 is a block diagram of some data used by a network device associated with the intelligent jack, according to one implementation.

Figure 1:
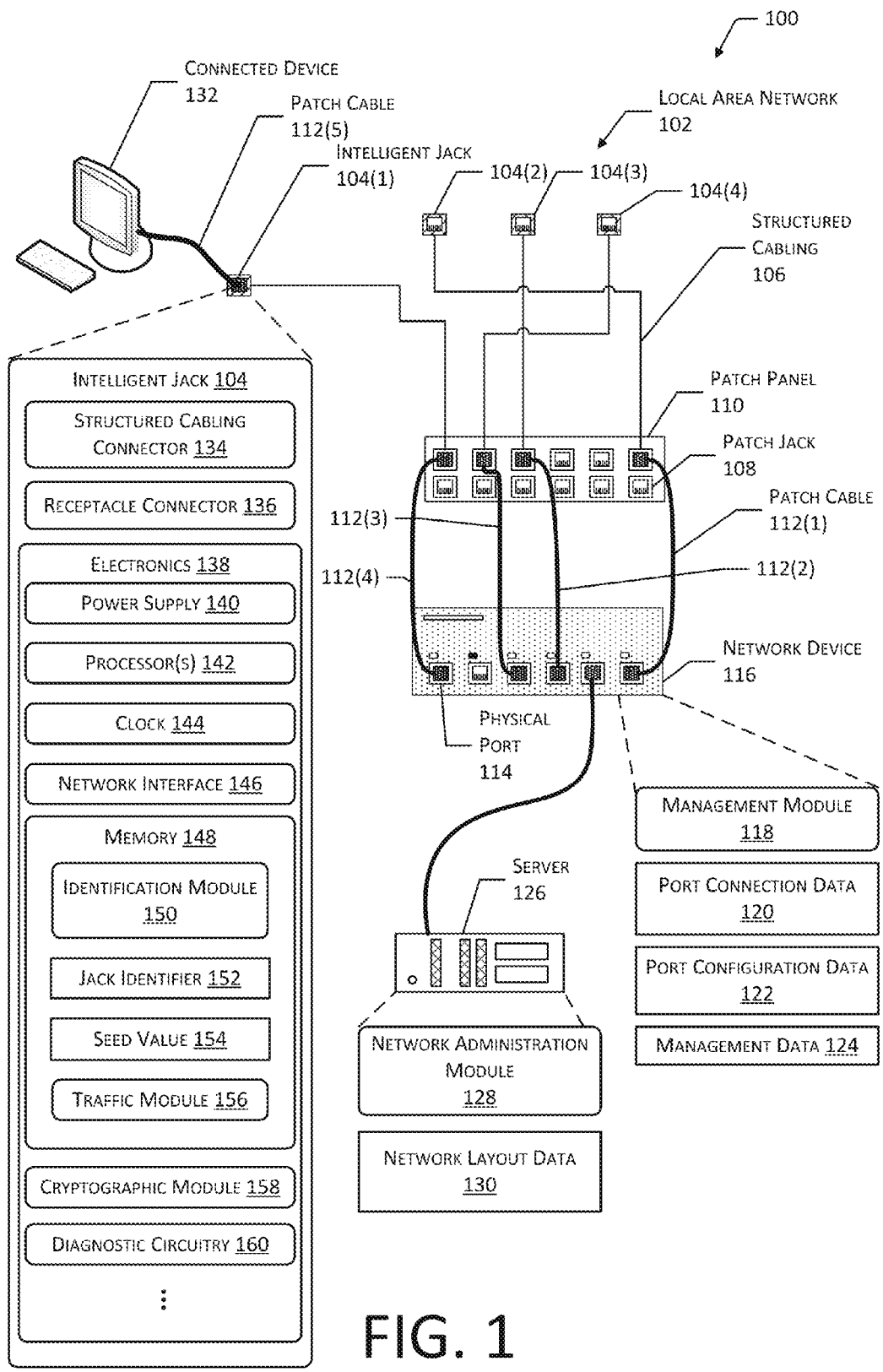
FIG. 1 is an illustrative system utilizing an intelligent jack to facilitate configuration of a network, according to one implementation.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Computer networks may use structured cabling to exchange signals. The structured cabling may include wires, adverse user experience, as the connected device may not properly connect to the intended network.

Described in this disclosure are devices and systems to facilitate the configuration of a network using an intelligent jack. A network device, such as a switch, may apply particular configuration to a particular physical port based on a jack identifier received from an intelligent jack connected to that port. Even as patch cords at the distribution frame between the patch jack and the physical port may be transferred among different ports, the network device is able to determine the specific intelligent jack that is attached to the physical port of the network device.

In one implementation, an intelligent jack is installed at an endpoint of the structured cabling. For example, the wall jack may utilize an intelligent jack. The intelligent jack contains circuitry that is able to provide a jack identifier to an upstream device connected to the structured cabling. The intelligent jack may receive power by way of the structured cabling. After powering up, the intelligent jack may send a data link layer (layer 2) frame that includes jack identifier data. The frame may be configured to use a media access control (MAC) address to identify a recipient, but does not utilize a higher level addressing scheme, such as a layer 3 internet protocol address. The jack identifier may comprise a value that distinguishes one intelligent jack from another. The intelligent jack may be assigned a jack identifier during manufacture or at time of initial installation.

The network device that is connected to the intelligent jack receives the jack identifier at a particular physical port. The network device may generate port connection data. For example, the port connection data may comprise a table or other data structure that associates the jack identifier that was received with the particular physical port used to receive the jack identifier.

The network device may determine port configuration data associated with the jack identifier. For example, a network administrator may have generated port configuration data that indicates a particular jack identifier is to be configured to use the "corporate" VLAN. The network device may then configure the particular physical port using the corresponding port configuration data. Continuing the example, the particular physical port may be configured to use the "corporate" VLAN.

The system may be used to enhance the administration of the network in several ways. For example, the use of the jack identifier allows a point of origin within the facility to be pinpointed to a particular physical location associated with the intelligent jack. In another example, a switch may be more easily configured by providing port configuration data. In this example, even as patch cables at the distribution frame are moved around, the configuration "follows" the particular intelligent jack.

Diagnostic circuitry at the intelligent jack may facilitate troubleshooting network problems. For example, the intelligent jack may be able to enter a "loopback" mode in which the diagnostic circuitry returns or echoes a signal sent from the network device to allow for testing. Such testing may reveal faults in the cabling that may be adversely impacting network performance. In another example, the intelligent jack may be configured to respond to a ranging signal, used to determine an estimated cable distance between the network device and the intelligent jack.

Network security is also improved using the techniques described. For example, an accidental or malicious rearrangement of the patch cables at the distribution frame only results in the switch reconfiguring the respective physical ports to correspond to the new arrangement of jack identifiers. In one implementation, network security may be enhanced by having the switch authenticate the intelligent jack. Once authenticated the intelligent jack may be used to pass traffic.

In another implementation, network security may be enhanced by having the intelligent jack provide authentication data to the connected device. For example, the intelligent jack may provide authentication data or other cryptographic credentials to the laptop connected to the intelligent jack. The connected device may then use the authentication data to establish encrypted communication with another device. For example, the authentication data may be used to encrypt packets sent to the network device.

Additional data, such as the estimated cable distance obtained by the diagnostic circuitry may be used to maintain security of the network. In one implementation, a change in the estimated cable distance beyond a threshold value may trigger an alarm. For example, a change in patch cords, insertion of an intermediary network device, rerouting of a physical cable, and so forth may result in a change in distance.

In another implementation, the estimated cable distance may be used to detect tampering or spoofing of a jack identifier. For example, the jack identifier "6b61656c616e" may be tested at installation and determined as having an estimated cable distance of 20.1 meters. If the network device subsequently determines that jack identifier "6b61656c616e" now has an estimated cable run of 80.5 meters, this may be indicative of an attempt to spoof or duplicate the jack identifier at another location.

The network device may deal with unexpected changes or changes beyond threshold values in several ways. For example, the network device may disable transfer of traffic on a physical port for which no jack identifier is received. In another example, the network device may permit only limited access, such as defaulting to the "guest" VLAN if the estimated cable distance has recently changed.

By using the devices and techniques described in this disclosure, the performance and security of the network may be improved while reducing the labor associated with maintaining the network.

FIG. 1 is an illustrative system 100 that utilizes an intelligent jack to facilitate configuration of a network, according to one implementation. A local area network 102, or other network, may be formed at a facility or other location by providing a communication connection two or more devices. One or more intelligent jacks 104(1), 104(2), . . . , 104(J) may be located at different points within the facility. For example, the intelligent jack 104(1) may be located in an office, intelligent jacks 104(2) and 104(3) may be in a conference room, and so forth.

The intelligent jack 104 may use structured cabling 106 to connect to a patch jack 108 located on patch panel 110. The structured cabling 106 may include one or more cables that are compliant with one or more specifications set forth by the Telecommunications Industry Association (TIA) or another standards body. For example, the structured cabling 106 may comprise Category 6 cable compliant with the least a portion of the ANSI/TIA-568-C.1 specification. In another example, the structured cabling 106 may comprise optical fibers. In some situations, the structured cabling 106 may also be known using other terms, such as "horizontal cabling", "infrastructure cabling", and so forth. The structured cabling 106 provides a pathway for signals to be propagated between the intelligent jack 104 and the patch jack 108.

The patch panel 110 may comprise a plurality of patch jacks 108. The structured cabling 106 may be mechanically, electrically, or mechanically and electrically coupled to the patch jack 108 using a punchdown block. The patch panel 110 may be part of the distribution frame. The distribution frame may comprise a common associate with operation of the local area network 102. An intermediate distribution frame may comprise an aggregation point for structured cabling 106 within a particular portion of the facility. Structured cabling 106 may then connect the intermediate distribution frames within the facility to a main distribution frame. The main distribution frame may also be used to terminate or establish other connections with outside networks, such as a telecommunication carrier.

Individual patch jacks 108 may be connected using a patch cable 112 to a physical port 114 on a network device 116. The patch cable 112 may comprise a relatively short length of structured cabling 106 or other cabling designed to transfer signals associated with the local area network 102 that is been terminated with plugs or other connectors. For example, the patch cables may comprise a length of Category 6 compliant cable with each end terminated with an eight position eight contact (8P8C) connector plug. These plugs or connectors may be complementary to the patch jack 108 and the physical port 114 to facilitate interconnection. The use of patch jacks 108 and patch cables 112 to connect to physical ports 114 facilitate easier configuration and subsequent reconfiguration of where the connection associated with a particular intelligent jack 104 eventually terminates. In this illustration patch cables 112(1), 112(2), 112(3), and 112(4) provide interconnections between respective patch jacks 108 and physical ports 114.

The network device 116 may comprise one or more of a network switch (switch), router, traffic concentrator, load balancer, server, and so forth. For the purposes of illustration, and not necessarily as a limitation, the network device 116 is described below as comprising one or more of the functions associated with the network switch. For example, the network device 116 may be able to implement virtual local area networks (VLANs), Link Layer Distribution Protocol (LLDP), Cisco Discovery Protocol (CDP), and so forth. The network device 116 may include a user interface that allows for configuration either at the network device 116, or remotely by way of the local area network 102. The network device 116 may also provide other functions, such as providing electrical power via the structured cabling 106 to the intelligent jack 104 or other devices connected thereto.

The network device 116 may include a management module 118. The management module 118 may be configured to operate in conjunction with the intelligent jack 104 to provide for configuration, operation, monitoring, and so forth of the local area network 102. The management module 118 may obtain port connection data 120. The port connection data 120 described in more detail below with regard to the intelligent jack 104. Based at least in part on the port connection data 120, the management module 118 may use port configuration data 122 to configure one or more of physical ports 114. For example, based on information provided by the intelligent jack 104, the network device 116 may configure the physical port 114 to which the intelligent jack 104 is connected to use a particular VLAN. The port configuration data 122 is described below in more detail.

The network device 116 may allow for remote management such that an administrator or administrative system may connect to the network device 116 and inspect or modify operation of the network device 116. The management data 124 may comprise information such as a network hostname, network management address, and so forth associated with the network device 116.

One or more servers 126 may be connected to the network device 116 to use the local area network 102 for communication with other devices. Server 126 may include a network administration module 128. The network administration module 128 may allow the server 126 to access the management module 118 of the network device 116. For example, a network administrator may login to the server 126 and use the network administration module 128 to specify that particular intelligent jacks 104 are associated with particular port configurations, such as designated VLANs.

The network administration module 128 may also be used to generate network layout data 130. The network device 116 may be configured to provide one or more of the port connection data 120, the port configuration data 122, or the management data 124 to the network administration module 128. Based on this information, the network administration module 128 may generate the network layout data 130. For example, the network layout data 130 may comprise information such as management data 124 for particular network devices 116, information about the intelligent jacks 104 and their respective physical ports 114 on the network device 116, and so forth.

The network administration module 128 may be used to generate data such as reports, alarms, initiate triggers, and so forth. For example, the network administration module 128 may receive data multicasted from one or more of the network devices 116. This data may include the port connection data 120, management data 124, and so forth. The network administration module 128 may process this information. For example, based on an unexpected change in the port connection data 120, the network administration module 128 may generate an alarm, send port configuration data 122 to a particular network device 116 to change the configuration of a particular physical port 114, and so forth.

A connected device 132 may use a patch cable 112 to connect to the intelligent jack 104. As a result, a signal that carries data from the connected device 132 may pass along the patch cable 112 to the intelligent jack 104, then through the structured cabling 106 to the patch jack 108 at the patch panel 110. From there, another patch cable 112 passes the signal to the physical port 114 on the network device 116. The connected device 132 may comprise workstation, laptop, network display device, network camera, home or building automation device, building security system device, servers, and so forth.

The intelligent jack 104 may include a structured cabling connector 134 and a receptacle connector 136. In one implementation, the structured cabling connector 134 may comprise one or more punchdown connectors, such as in the "110 block" form factor. A wire from the structured cabling 106 is inserted into a particular punchdown connector, within which the outer insulation is penetrated electrical contact is.

The receptacle connector 136 comprises a receptacle configured to accept a plug of the patch cable 112. For example, the receptacle connector 136 may comprise an 8P8C receptacle that accepts an 8P8C plug from the patch cable 112(5).

Intelligent jack 104 may include electronics 138. The electronics 138 comprises circuitry to perform one or more of the functions described in this disclosure. The power supply 140 is configured to provide electrical power to the electronics 138. In one implementation, the power supply 140 may comprise circuitry to obtain electrical power from the structured cabling 106. For example, the power supply 140 may be able to utilize electrical power provided using the Power Over Ethernet (POE) standards IEEE 802.3at-2009 as promulgated by the Institute for Electrical and Electronics Engineers (IEEE). In other implementations, the power supply 140 may comprise a battery, wireless power receiver, external power supply drawing electricity from building wiring, and so forth.

The intelligent jack 104 may include one or more hardware processors 142 (processors) configured to execute one or more stored instructions. The processors 142 may comprise one or more cores. One or more clocks 144 may provide information indicative of date, time, ticks, and so forth. For example, the processor 142 may use data from the clock 144 to generate a timestamp, trigger a preprogrammed action, and so forth. In some implementations, one or more of the components described with regard to the intelligent jack 104 may be implemented by one or more of an application specific integrated circuit (ASIC), system-on-a-chip (SOC), a microcontroller, and so forth.

The intelligent jack 104 may include a network interface 146. The network interface 146 is configured to provide communications between the intelligent jack 104 and other devices, such as the network device 116 in some implementations, intelligent jack 104 may have a limited subset of functions. For example, the network interface 146 may be configured operate only at the data link layer (layer 2) of the Open Systems Interconnection (OSI) model.

In some implementations, the network interface 146 may be configured to limit communication to the receptacle connector 136. For example, the network interface 146 may be designed such that data may be sent and received using structured cabling connector 134, but not the receptacle connector 136.

Intelligent jack 104 may include one or more memories 148. The memory 148 comprises one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 148 provides storage of computer-readable instructions, data structures, program modules, and other data for the operation of the intelligent jack 104.

A few example functional modules are shown stored in the memory 148, although the same functionality may alternatively be implemented in hardware, firmware, or as a SOC. An identification module 150 may be configured to send a jack identifier 152 to the network device 116 using the network interface 146 connected to the structured cabling 106. In some implementations, jack identifier 152 may be sent to the data link layer. The jack identifier 152 comprises information that may be used to identify or otherwise distinguish a particular intelligent jack 104 from other intelligent jacks 104. For example, the jack identifier 152 may comprise a media access control (MAC) address. The jack identifier 152 may be assigned during manufacture of the intelligent jack 104, as part of an installation process, and so forth.

In some implementations, the identification module 150 may be configured to send the jack identifier 152 only using the receptacle connector 136. This prevents the connected device 132 from receiving the jack identifier 152.

The identification module 150 may be configured to send the jack identifier 152 response to one or more events. The events may include one or more of power up of the electronics 138 on board the intelligent jack 104, connection of the connected device 132 to the receptacle connector 136, disconnection of a connected device 132 to the receptacle connector 136, at a predetermined time interval, responsive to an interrogation request received using the network interface 146, and so forth. For example, the clock 144 may provide a timer that results in the periodic transmission of the jack identifier 152.

In some implementations, the jack identifier 152 may be generated at least in part based on other information. For example, a seed value 154 may be stored within the memory 148. The seed value 154 may comprise a previously stored value, random number, pseudorandom number, cryptographic credential, token value, current time, and so forth. In one implementation, seed value 154 may comprise a MAC address, globally unique identifier (GUID), or other value.

The intelligent jack 104 may receive an interrogation value. The interrogation value and the seed value 154 may be used as inputs to a function that generates the jack identifier 152. For example, the seed value 154 and the interrogation value may be passed to generate the jack identifier 152.

Traffic module 156 may be stored in the memory 148. Traffic module 156 may be configured to provide one or more functions associated with transferring data through the intelligent jack 104 between the structured cabling connector 134 and the receptacle connector 136. In one implementation the traffic module 156 may be configured to allow the intelligent jack 104 to act as a switch. For example, traffic module 156 may direct traffic to or from the receptacle connector 136 based at least in part on a MAC address. In other implementations, the traffic module 156 may be omitted, and the network interface 146 may couple to the wiring within the intelligent jack 104 that extends between the structured cabling connector 134 and the receptacle connector 136.

The intelligent jack 104 may include a cryptographic module 158. The cryptographic module 158 may comprise instructions stored in the memory 148, dedicated hardware, or combination thereof. The cryptographic module 158 may be configured to generate the jack identifier 152 based on the seed value 154. Continuing the example given above, the cryptographic module 158 may generate the jack identifier 152 by applying a cryptographic function to the seed value 154 and interrogation value received from the network device 116.

In another example, the cryptographic module 158 may generate the jack identifier 152 using the seed value 154 in conjunction with output from another device, such as a time value generated by the clock 144.

In some implementations, the cryptographic module 158 may be used to encrypt traffic sent to the structured cabling connector 134 and decrypt traffic received from the structured cabling connector 134. For example, the cryptographic module 158 may use the jack identifier 152 to encrypt traffic between intelligent jack 104 and another device such as the network device 116. This may improve the security of the system by enciphering the data transferred over the structured cabling 106.

The intelligent jack 104 may include diagnostic circuitry 160. In one implementation the diagnostic circuitry 160 may include one or more components to provide a predetermined electrical resistance or electrical reactance. These components may be used in conjunction with government the network device 116 to use time domain reflectometry to determine a distance between the intelligent jack 104 and the network device 116. In another implementation, the diagnostic circuitry 160 may comprise one or more components to establish a loopback path. The loopback path may allow a signal to be sent from the network device 116 and have that signal returned by the intelligent jack 104 to the network device 116. In another implementation, the diagnostic circuitry 160 may be configured to generate test patterns that may be sent to one or more of the structured cabling connector 134 or the receptacle connector 136.

By utilizing the diagnostic circuitry 160, physical faults associated with the infrastructure of a local area network 102 may be more easily determined, isolated, and subsequently remedied. For example, a signal may be sent to the intelligent jack 104 to activate the diagnostic circuitry 160. As described, the diagnostic circuitry facilitates analysis of at least a portion of a structured cabling 106 and the patch cables 112 that are between the intelligent jack 104 and the network device 116. In some implementations the signal may comprise a packet that includes one or more instructions or commands. In other implementations the signal may comprise a particular waveform, voltage, duration, and so forth that are configured to trigger the diagnostic circuitry 160.

FIG. 2 is a block diagram 200 of some data used by a network device 116 associated with the intelligent jack 104, according to one implementation.

The management module 118 of the network device 116 may generate port connection data 120. The port connection data 120 may comprise information about connections made to the network device 116. For example, the port connection data 120 may include one or more of a received jack identifier 202, physical port identifier 204, connect time 206, estimated cable distance 208, and so forth. The received jack identifier 202 may comprise the jack identifier 152 that was obtained by the network device 116 at a particular physical port 114. The physical port identifier 204 indicates the particular physical port 114 for the record in the port connection data 120. The connect time 206 may comprise information indicative of the date and time when the intelligent jack 104 was last connected.

As described above, the intelligent jack 104 may include diagnostic circuitry 160 to facilitate time domain reflectometry and the determination of an estimated cable distance between the network device 116 or another test device and the intelligent jack 104. In some implementations the network device 116 may be configured to use the diagnostic circuitry 160 to determine the estimated cable distance 208 and store this information the port connection data 120.

The port connection data 120 may include other information as well. For example, a last update time may be stored that indicates the last time a particular record was updated.

While the port connection data 120, port configuration data 122, the management data 124, and other information in this disclosure are depicted as tables, other data structures may be used to store the information. For example, the connection data 120 may be stored as a linked list.

The port configuration data 122 may include the jack identifier 152, and assigned VLAN 210, security level 212, or other information. The jack identifier 152, as described above, is indicative of a particular intelligent jack 104. The assigned VLAN 210 designates a particular VLAN to be used in configuring a particular physical port 114 that is attached to the intelligent jack 104 having the jack identifier 152.

The security level 212 may indicate particular settings to further enhance security of local area network 102. For example, the security level of "1" may indicate that traffic between the intelligent jack 104 and the network device 116 is to be encrypted. Continuing the example, the first jack identifier 152(1) may be received at a first physical port 114(1) as sent by a first intelligent jack 104(1). A second jack identifier 152(2) may be received at a second physical port 114(2), as sent by a second intelligent jack 104(2). The port connection data 120 may be generated that associates the second jack identifier 152(2) with the second physical port 114(2). The port configuration data 122 may be determined that indicates with the first jack identifier 152(1) and the second jack identifier 152(2) are designated as using a high security connection. The network device 116 may then forward one or more packets between the first physical port 114(1) and the second physical port 114(2). In some implementations as described above, the packets may be encrypted between the first intelligent jack 104(1) and the second intelligent jack 104(2). Thus, traffic may be directed by the network device 116 based on the jack identifiers 152, instead of other information such as a MAC address of the packets.

As described above, the intelligent jack 104 may use the cryptographic module 158 to encrypt traffic sent to the network device 116, and decrypt traffic received from the network device 116. In another example, the intelligent jack 104 may send cryptographic credentials to the connected device 132, which may then handle the encryption and decryption functions.

The management data 124 may include one or more of a network hostname 214 or network management address 216 that are associated with the network device 116. For example, the network device 116 may have a network hostname 214 of "dev1.example.com" and a network management address 216 of "10.0.20.100". By using the management data 124 the network administration module 128 may be able to connect to the management module 118 and acquire information from the network device 116, configure the network device, and so forth.

Figure 3:
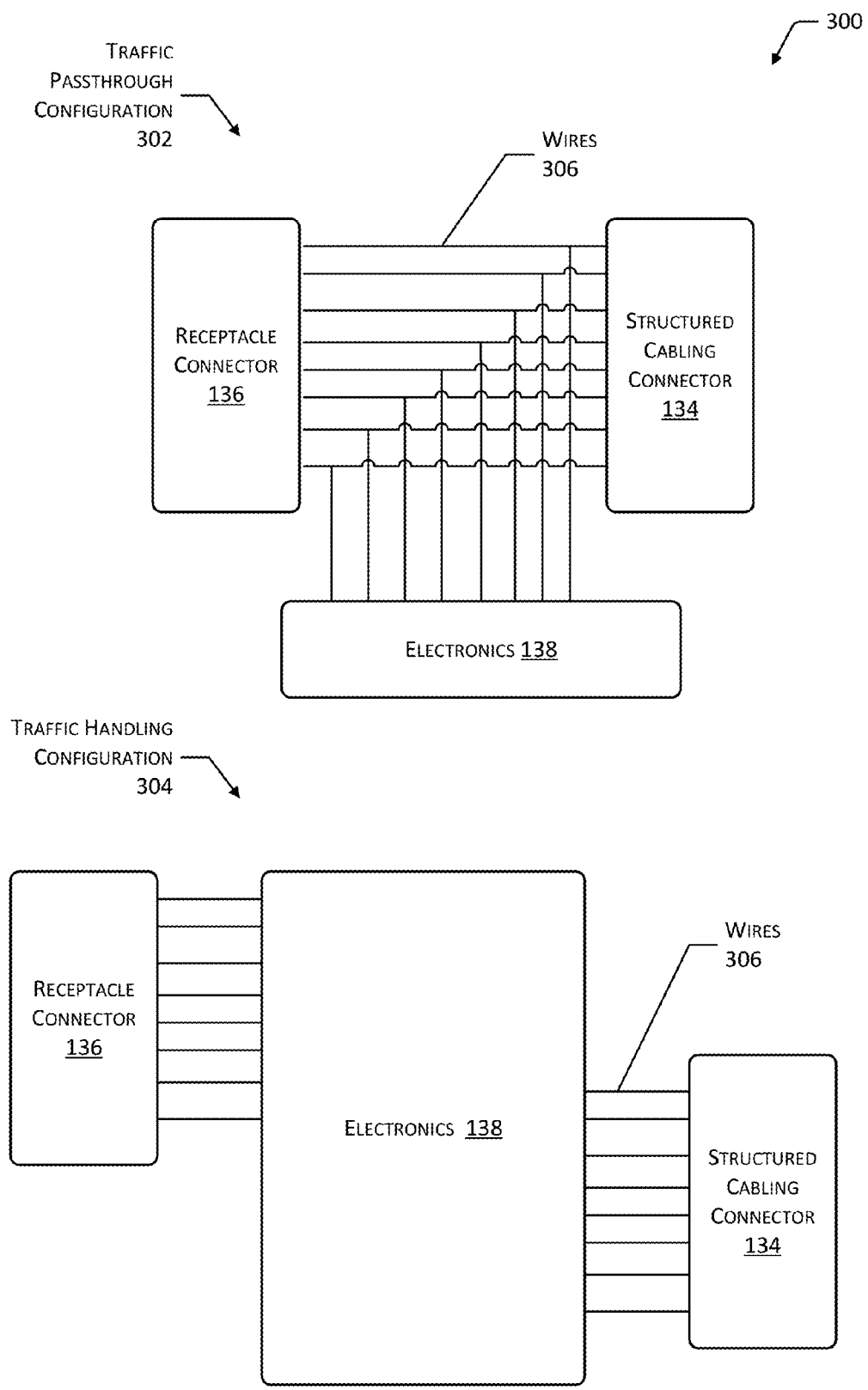
FIG. 3 illustrates a traffic passthrough configuration and a traffic handling configuration of the intelligent jack, according to one implementation.

FIG. 3 illustrates configurations 300 of the intelligent jack 104, according to one implementation. The intelligent jack 104 may interact with data traffic in a variety of different configurations. A traffic passthrough configuration 302 and a traffic handling configuration 304 are depicted here.

In the traffic passthrough configuration 302, wires 306 may connect pins in the receptacle connector 136 to individual punchdown connectors within the structured cabling connector 134. The electronics 138 may connect to one or more of the wires 306. For example, the network interface 146 of the intelligent jack 104 may connect to each of the respective eight conductors associated with Category 6 cabling. In this configuration, the electronics 138 and the connected device 132 are effectively on the same bus in that they share common wires 306. For example, the network interface 146 of the intelligent jack 104 may be able to receive the traffic sent to and from the connected device 132, and vice versa.

In some implementations, the traffic passthrough configuration 302 may include one or more electrical components such as diodes, resistors, or transistors to control where signals generated by the electronics 138 are propagated to. For example, diodes may be used to allow the network interface 146 of the intelligent jack 104 to communicate with the network device 116, while preventing the same signals from reaching the receptacle connector 136. With this technique, network security may be enhanced by preventing the connected device 132 for being able to receive data transmitted by the intelligent jack 104.

In comparison, the traffic handling configuration 304 utilizes the electronics 138 of the intelligent jack to more actively control the transfer of data between the connected device 132 and the network device 116. For example, in the traffic handling configuration 304 the traffic module 156 may be used to store and forward individual packets of data between the receptacle connector 136 and structured cabling connector 134 based at least in part on a MAC address.

In other implementations, other configurations may be used.

Figure 4:
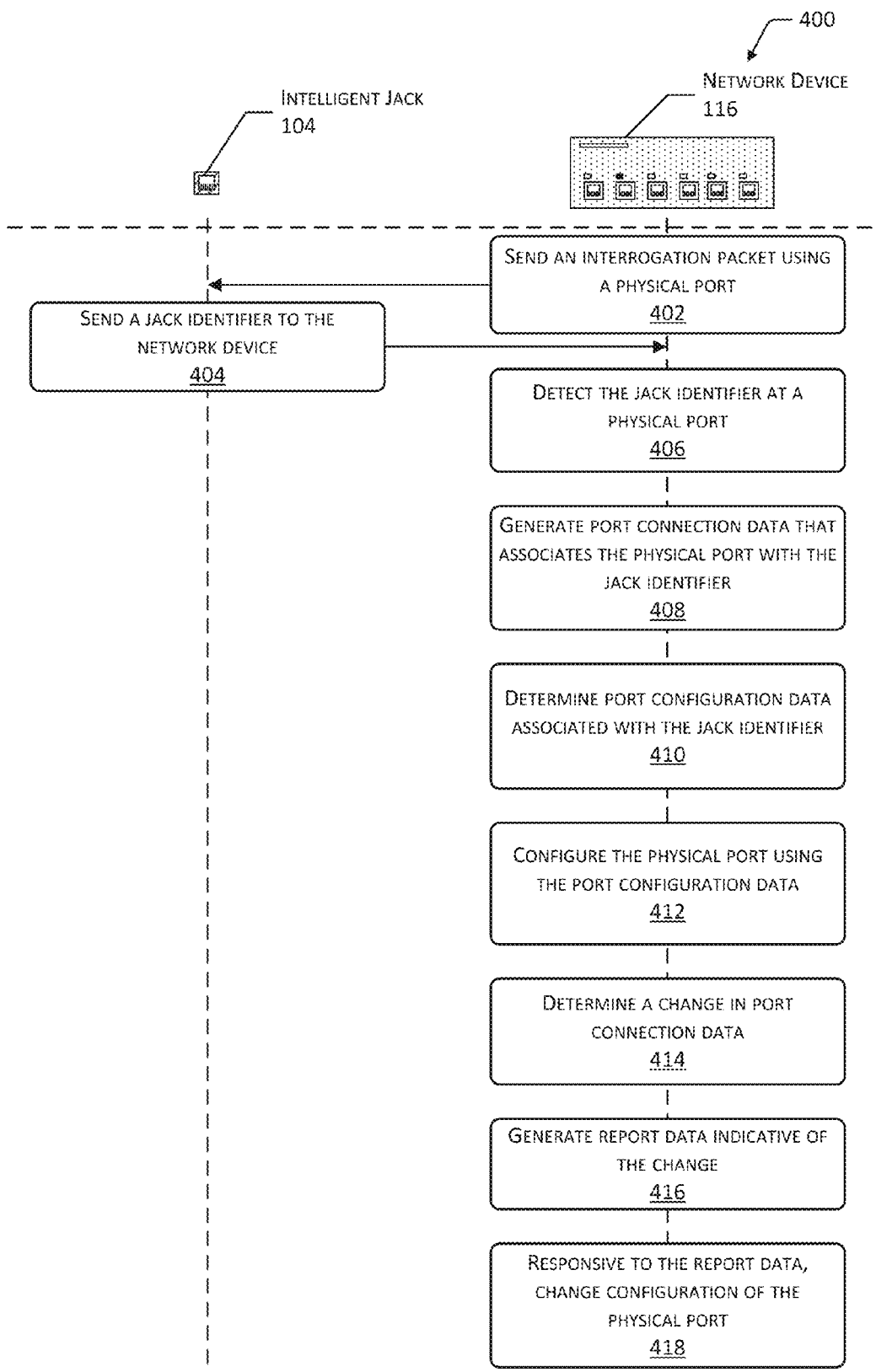
FIG. 4 illustrates a flow diagram of a process to use an intelligent jack to configure a network, according to one implementation.

FIG. 4 illustrates a flow diagram 400 of a process to use an intelligent jack 104 to configure a network, according to one implementation. The process may be performed at least in part by one or more of the intelligent jack 104 or the network device 116.

At 402 the network device 116 sends an interrogation request, such as an interrogation packet, using the physical port 114. In some implementations, the interrogation request may be omitted. For example, the intelligent jack 104 may be configured to send the jack identifier 152 upon start up, at a predetermined interval, upon connector disconnect of the connected device 132, and so forth.

At 404 the intelligent jack 104 sends the jack identifier 152 to the network device 116 using the structured cabling 106 connected to the structured cabling connector 134. In some implementations, the jack identifier 152 may be sent responsive to the interrogation packet.

At 406 the jack identifier 152 is determined at one of the plurality of physical ports 114 on the network device 116. For example, the network device 116 may receive the jack identifier 152.

At 408 port connection data 120 that associates the jack identifier 152 with the one of the physical ports 114 is generated. For example, the received jack identifier 202 may be populated with the jack identifier 152 having a value of "6b61656c616e", the physical port identifier 204 "0,1" may be generated based on information from the network device 116, and so forth.

At 410 port configuration data 122 associated with the jack identifier 152 is determined. For example, the port configuration data 122 may be received from the network administration module 128. The port configuration data 122 may specify that the particular jack identifier 152 of "6b61656c616e" is assigned to VLAN "1". In another example, the port configuration data 122 may be generated at the network device 116. Continuing the example, the network device 116 may provide a user interface which allows an administrator to log in and create the port configuration data 122.

At 412 the one of the plurality of physical ports 114 is configured using the port configuration data 122 associated with the jack identifier 152. Contain the example above, physical port 114 "0,1" is configured to use VLAN "1".

At 414 a change in port connection data 120 may be determined. The change may be indicative of the jack identifier 152 being detected at a different one of the plurality of physical ports 114. For example, the jack identifier 152 may be detected at a first time at physical port 114(1) and at a later second time at physical port 114(2).

At 416 report data indicative of the change may be generated. For example, an exception report may be sent to the network administration module 128 indicating this change has occurred. In other implementations, other report data may be generated.

In some implementations, the network device 116 may send the port connection data 120 to the network administration module 128. For example, a multicast may be sent to a particular address that is used by the servers 126 to obtain port connection data 120. Each network device 116 may send a multicast that is then received by an associated device such as one or more servers 126. The network administration module 128 may determine changes in the port connection data 120 from one time to another and may generate report data.

In some implementations, other actions may be taken instead of or in addition to the generation of report data. For example, when changes associated with the port configuration data 122 such as the jack identifier 152, the physical port identifier 204, and so forth, exceeds a threshold value of changes per unit time an alarm may be generated. Responsive to this alarm, the physical port 114 may be disabled, communication by the physical port 114 may be limited, and so forth.

For example, prior port connection data 120 may be accessed that associates the first jack identifier 152(1) with a second physical port 114(2) at a prior time. A low security version of the port configuration data 122 may be accessed. The low security version may be configured to restrict access to a network, such as preventing access to the server 126. The first physical port 114(1) may be configured using the low security port configuration data based on the change from the first jack identifier 152(1) having moved from the second physical port 114(2) at a prior time to the current position at the first physical port 114(1).

Figure 5:
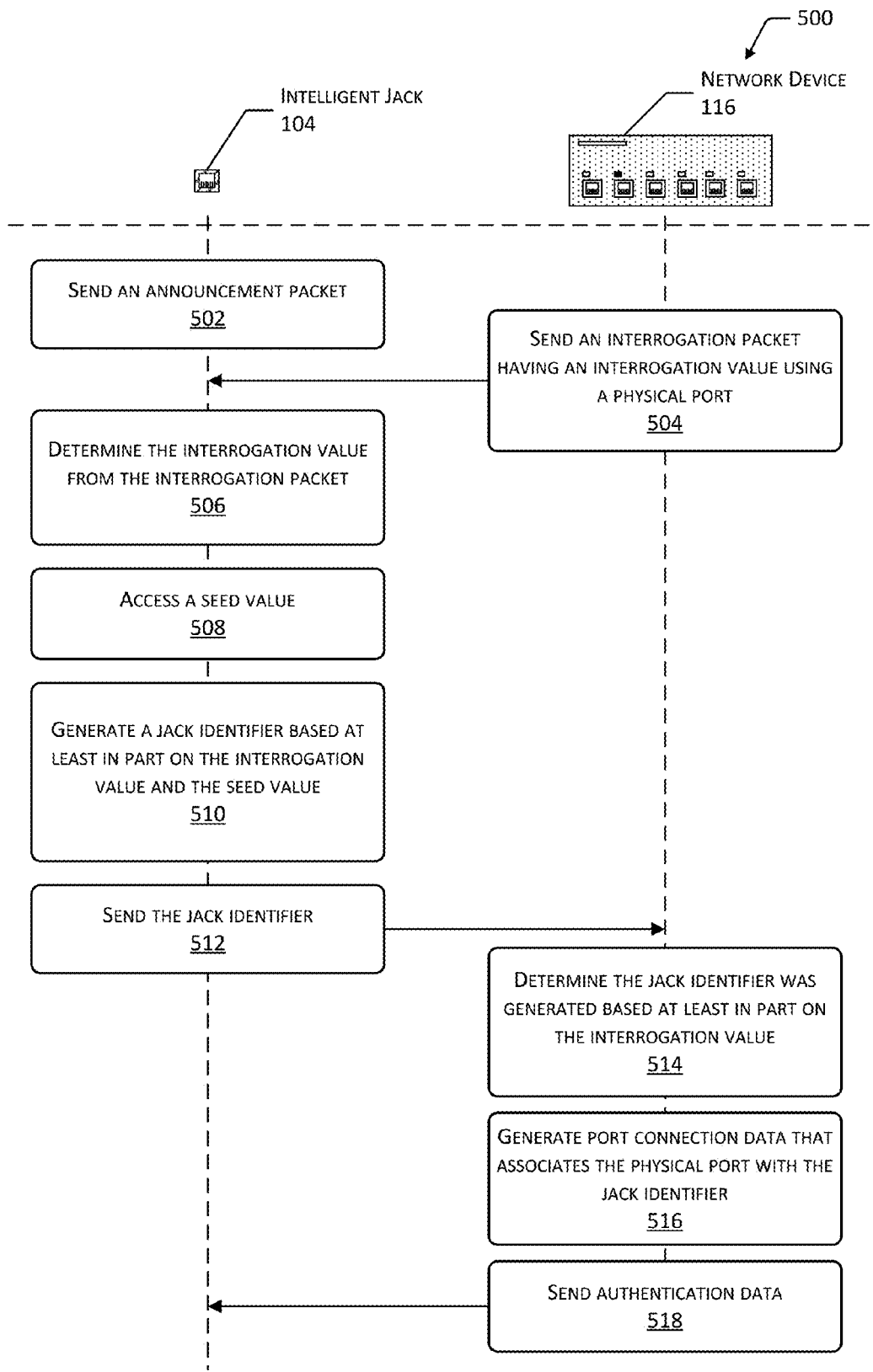
FIG. 5 illustrates a flow diagram of a process to authenticate an intelligent jack, according to one implementation.

FIG. 5 illustrates a flow diagram 500 of a process to authenticate an intelligent jack 104, according to one implementation. The process may be performed at least in part by one or more of the intelligent jack 104 or the network device 116.

At 502 the intelligent jack 104 may send an announcement packet. For example, the announcement packet may comprise information indicating that the intelligent jack 104 is powered up and ready for use.

At 504 the network device 116 sends an interrogation packet to the intelligent jack 104 using the physical port 114 that the announcement packet was received on. The interrogation packet may include an interrogation value. For example, the interrogation value may comprise a previously stored value, a random number, a pseudorandom number, cryptographic credential, a token value, current time, and so forth.

At 506 the intelligent jack 104 determines the interrogation value from the interrogation packet. In some implementations, the intelligent jack 104 may verify the interrogation value. For example, the interrogation value may comprise an encrypted value that is subsequently decrypted by the intelligent jack 104. In some implementations, the process may be halted if the interrogation value is not properly verified.

At 508 a seed value 154 stored in the memory 148. Seed value may comprise a previously stored value, random number, pseudorandom number, cryptographic credential, token value, current time, and so forth. In one implementation, seed value 154 may comprise a MAC address, globally unique identifier (GUID), or other value.

At 510 the intelligent jack 104 generates the jack identifier 152 based at least in part on one or more of the interrogation value or the seed value 154. For example, the jack identifier 152 may comprise a hash created by using the interrogation value and the seed value 154 as inputs.

At 512 the jack identifier 152 is sent using the structured cabling connector 134. For example, the network interface 146 may be used to send a packet that includes the jack identifier 152.

At 514 the network device 116 authenticates the jack identifier 152. In one implementation, the network device 116 may determine the jack identifier 152 was generated based at least in part on the interrogation value. In another implementation, the network device 116 may determine the jack identifier 152 was generated based at least in part on the seed value 154.

At 516 the network device 116 generates the port connection data 120. As described above, port connection data 120 associates physical port 114 with the jack identifier 152.

At 518, the network device 116 may send authentication data to the intelligent jack 104. For example, the network device 116 may send data indicative of successful authentication. In another example, the network device 116 may send the intelligent jack 104 one or more of cryptographic credentials, tokens, and so forth.

Figure 6:
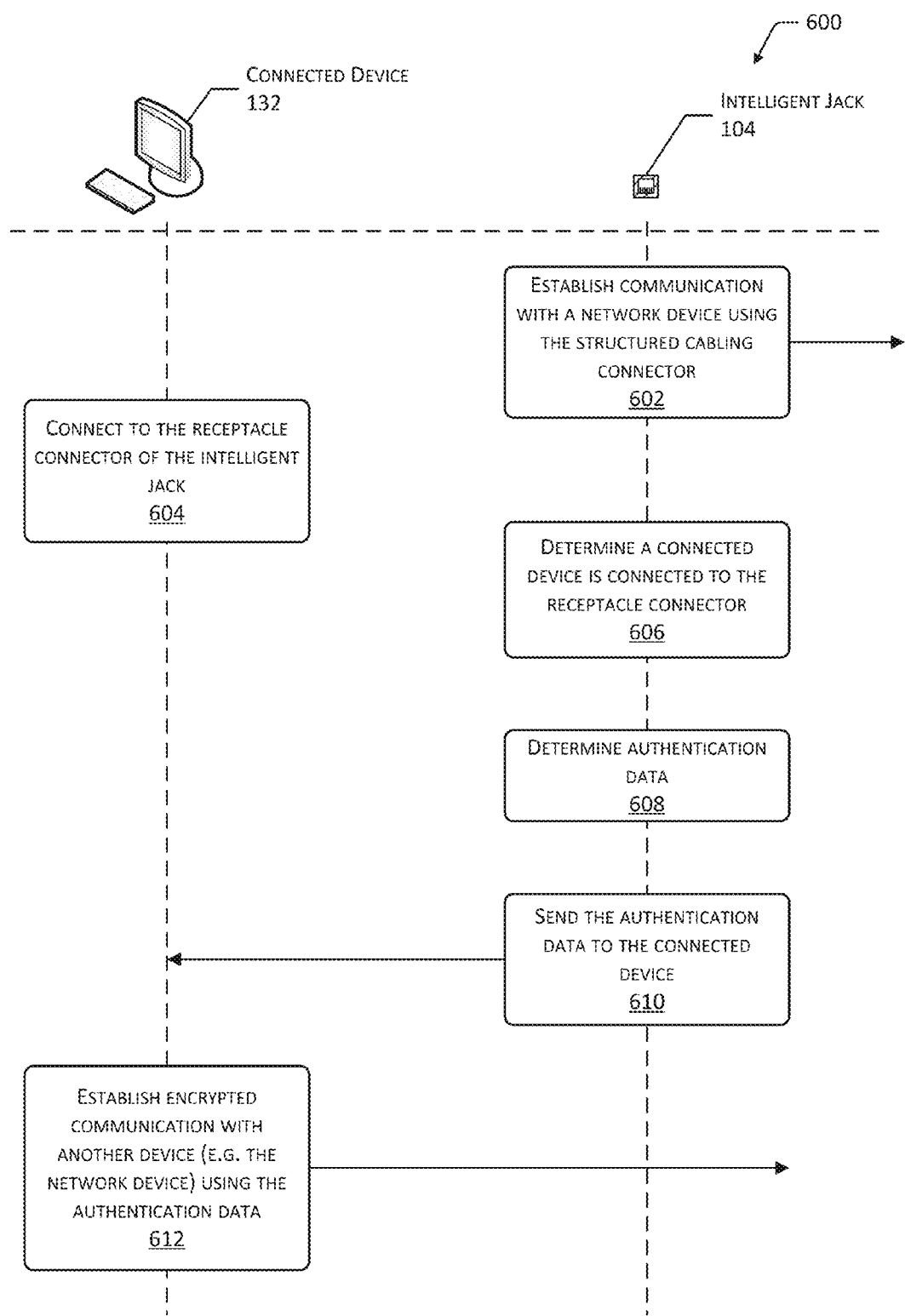
FIG. 6 illustrates a flow diagram of a process to use an intelligent jack to establish encrypted communication, according to one implementation.

FIG. 6 illustrates a flow diagram 600 of a process to use an intelligent jack 104 to establish encrypted communication, according to one implementation. The process may be performed at least in part by one or more of the connected device 132, the intelligent jack 104, or the network device 116.

At 602 the intelligent jack 104 establish as communication with the network device 116 using structured cabling connector 134.

At 604 the connected device 132 is connected to the receptacle connector 136 of the intelligent jack 104. For example, the user may connect the connected device 132 and the intelligent jack 104 using a patch cable 112.

At 606 the intelligent jack 104 determines the connected device 132 is connected to the receptacle connector 136. For example, a change in the voltage or continuity across two or more pins of the receptacle connector 136 may be used to determine that the connected device 132 is communicatively coupled to the receptacle connector 136.

At 608 the intelligent jack 104 determines the authentication data. As described above with regard to FIG. 5, in one implementation the authentication data may be obtained from the network device 116. In another implementation, the intelligent jack 104 may generate the authentication data itself. For example, the cryptographic module 158 may use the seed value 154 and time data obtained from the clock 144 to generate the authentication data.

At 610 the authentication data is sent to the connected device 132 using the receptacle connector 136.

At 612 the connected device 132 may use the authentication data to establish encrypted communication with another device. For example, the authentication data may be used as a cryptographic initialization vector or shared key for an encryption session.

In another implementation, the operation at 610 may be omitted, and the intelligent jack 104 may use the cryptographic module 158 and the authentication data to establish the encrypted communication with another device.

Figure 7:
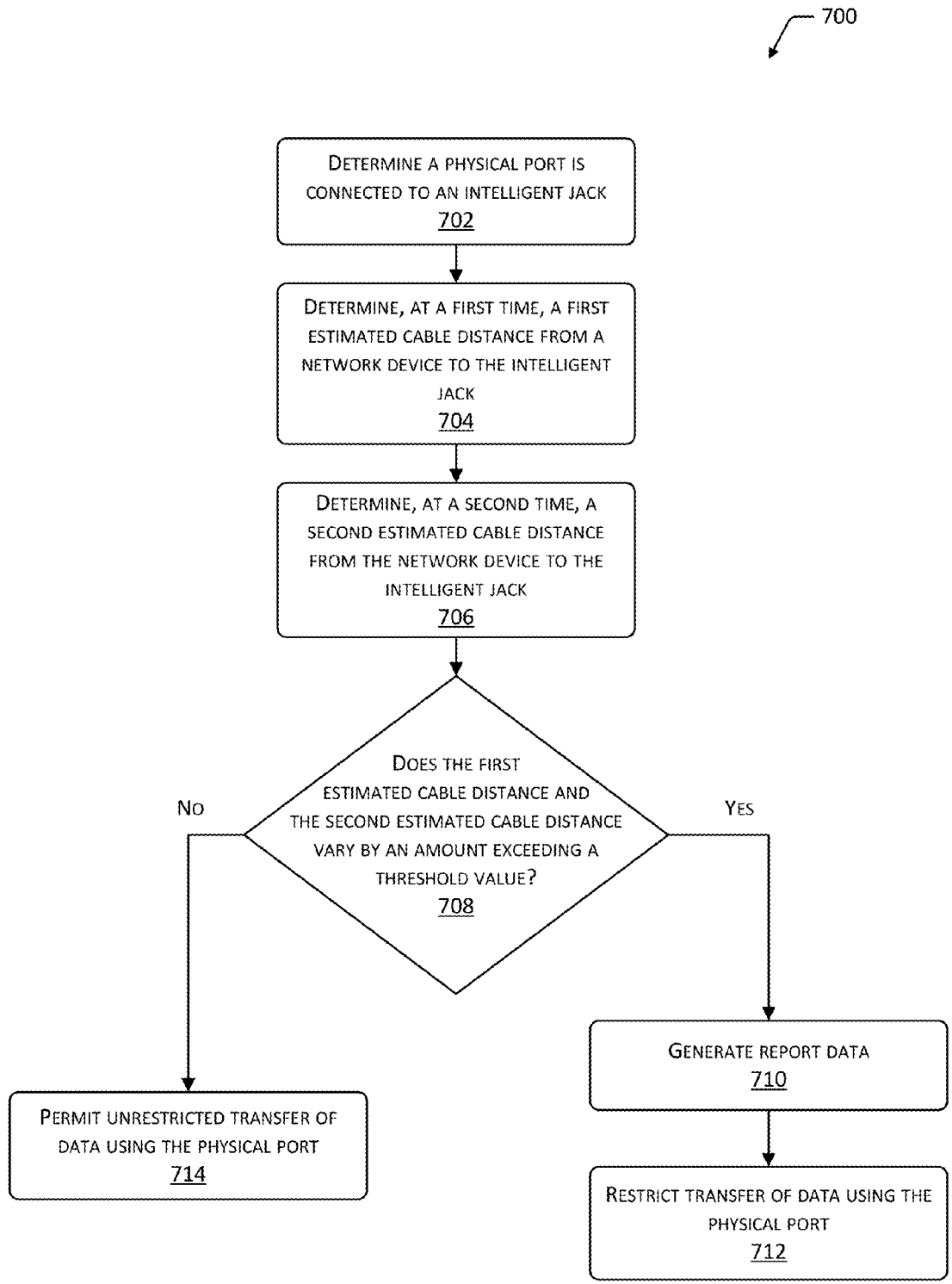
FIG. 7 illustrates a flow diagram of a process to use an intelligent jack to determine a change in cabling, according to one implementation.

FIG. 7 illustrates a flow diagram 700 of a process to use an intelligent jack 104 to determine a change in cabling, according to one implementation. The process may be performed at least in part by one or more of the intelligent jack 104 or the network device 116. A change in the cabling may be used to detect tampering or other physical changes associated with the structured cabling 106. While the following example describes the use of estimated cable distance, other characteristics may be used to determine changes in the cabling. For example, electrical resistance, reactance, and so forth may be determined at different times and compared to determine changes in the structured cabling 106.

At 702, the network device 116 determines the physical port 114 is connected to an intelligent jack 104. For example, the network device 116 may receive the jack identifier 152.

At 704, a first estimated cable distance from the network device 116 to the intelligent jack 104 is determined at a first time. For example, a first cable ranging signal may be sent using the physical port 114 connected to the intelligent jack 104. Based at least in part on the first cable ranging signal, a first estimated cable distance of the cable between the network device 116 and the intelligent jack 104 may be determined. Continuing the example, time domain reflectometry may be used to determine the first estimated cable distance.

At 706, a second estimated cable distance from the network device 116 to the intelligent jack 104 is determined at a second time. For example, a second cable ranging signal may be sent using the physical port 114 connected to the intelligent jack 104. Based at least in part on the second cable ranging signal, a second estimated cable distance of the cable between the network device 116 and the intelligent jack 104 may be determined. Continuing the example, time domain reflectometry may be used to determine the second estimated cable distance.

At 708 a determination may be made as to whether the first estimated cable distance or the second estimated cable distance vary by an amount exceeding a threshold value. The threshold value may specify an absolute value, a percentage variance, and so forth.

When the determination of 708 is that the two cable distances vary by more than a threshold value, the process may proceed to 710. At 710 data indicative of a possible change in length of the structured cabling 106 and the patch cable 112 between the network device 116 and intelligent jack 104 is generated. The data may include one or more of an alarm, report, and so forth. This information may be sent to another device, such as the network administration module 128.

At 712, transfer of data using the physical port 114 that is deemed to be suspect may be restricted. For example, management module 118 may deactivate the physical port 114, change the port configuration data 122, restrict what other physical ports 114 the now suspect physical port 114 is permitted to communicate with, and so forth.

When the determination of 708 is that the two cable distances do not vary by more than a threshold value, the process may proceed from 708 to 714. At 714 the management module 118 may permit unrestricted transfer of data using the physical port 114 as configured by the port configuration data 122.

Figure 8:
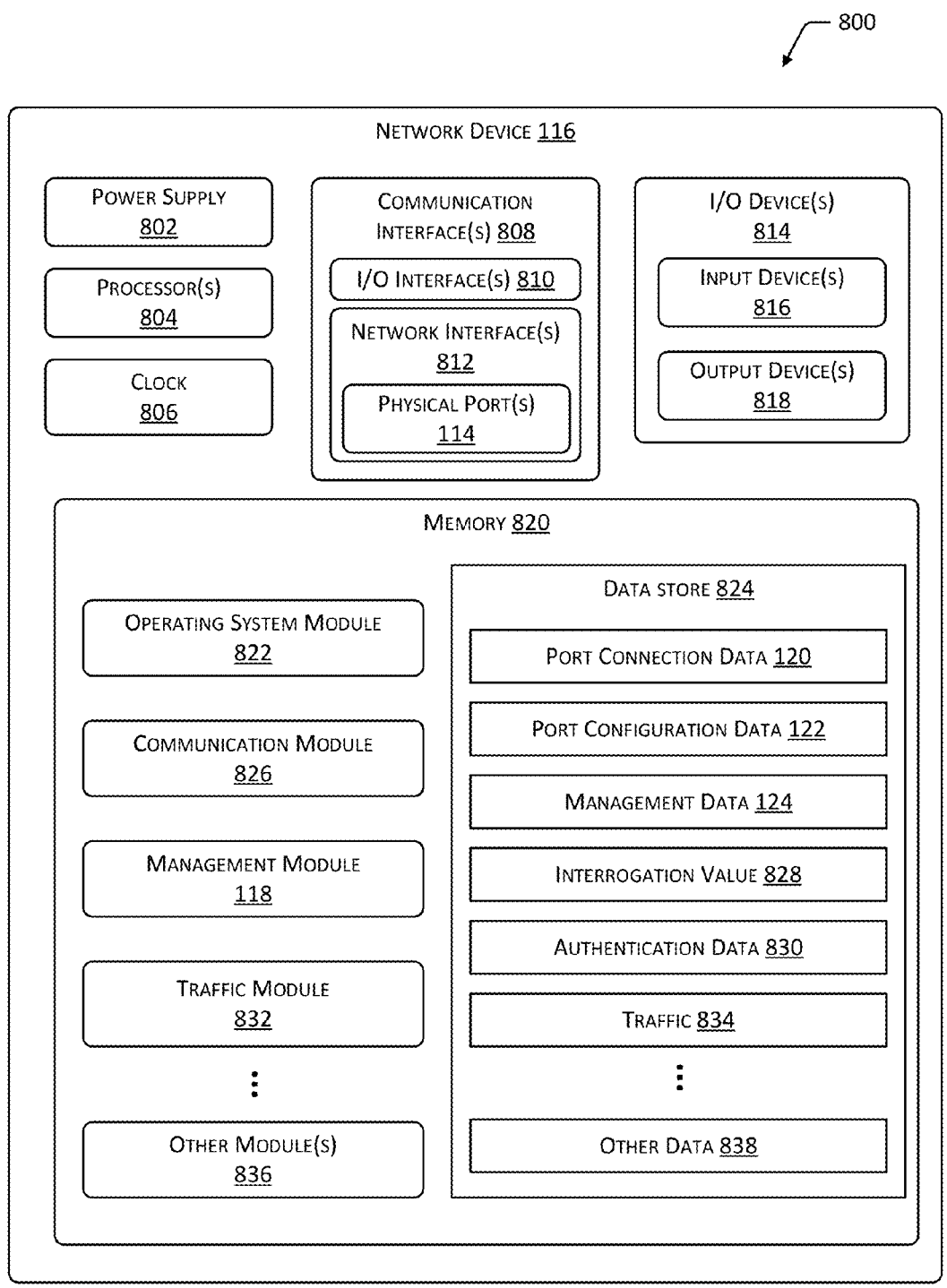
FIG. 8 illustrates a block diagram of the network device that may be configured using information from the intelligent jack, according to one implementation.

FIG. 8 illustrates a block diagram 800 of the network device 116 that may be configured using information from the intelligent jack 104, according to one implementation.

One or more power supplies 802 are configured to provide electrical power suitable for operating the components in the network device 116. For example, the power supply 802 may convert alternating current from building mains to direct current. In some implementations, the power supply 802 may include a power over Ethernet injector or other device to energize the structured cabling 106 and provide electrical power to devices connected thereto.

The network device 116 may include one or more hardware processors 804 (processors) configured to execute one or more stored instructions. The processors 804 may comprise one or more cores. One or more clocks 806 may provide information indicative of date, time, ticks, and so forth. For example, the processor 804 may use data from the clock 806 to generate a timestamp, trigger a preprogrammed action, and so forth. In some implementations, one or more of the components described with regard to the network device 116 may be implemented by one or more of an application specific integrated circuit (ASIC), system-on-a-chip (SOC), a microcontroller, and so forth.

The network device 116 may include one or more communication interfaces 808 such as I/O interfaces 810, network interfaces 812, and so forth. The communication interfaces 808 enable the network device 116, or components thereof, to communicate with other devices or components. The communication interfaces 808 may include one or more I/O interfaces 810. The I/O interfaces 810 may comprise interfaces such as Inter-Integrated Circuit (I2C), Serial Peripheral Interface bus (SPI), Universal Serial Bus (USB), RS-232 interface, and so forth.

The I/O interface(s) 810 may couple to one or more I/O devices 814. The I/O devices 814 may include input devices 816 such as one or more touch sensors, buttons, switches, and so forth. The I/O devices 814 may also include output devices 818. For example, the output devices 818 may include one or more of a light emitting diode, a liquid crystal display, an electrophoretic display, a speaker, a haptic output device, and so forth. In some embodiments, the I/O devices 814 may be physically incorporated with the network device 116 or may be externally placed.

The network interface(s) 812 are configured to provide communications between the network device 116 and other devices, such as the intelligent jack 104, the server 126, the connected device 132, and so forth. The network interfaces may include devices configured to couple to personal area networks (PANs), local area networks (LANs), wide area networks (WANs), and so forth. The network interface 812 may comprise one or more components such as radio receivers, radio transmitters, and so forth to provide for connectivity with a wireless network. The network interface 812 may include devices compatible with Ethernet, Wi-Fi, Bluetooth, ZigBee, 2G, 4G, LTE, and so forth.

The network device 116 may also include one or more busses or other internal communications hardware or software that allow for the transfer of data between the various modules and components of the network device 116.

As shown in FIG. 8, the network device 116 includes one or more memories 820. The memory 820 comprises one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 820 provides storage of computer-readable instructions, data structures, program modules, and other data for the operation of the network device 116. A few example functional modules are shown stored in the memory 820, although the same functionality may alternatively be implemented in hardware, firmware, or as a SOC.

The memory 820 may include at least one operating system (OS) module 822. The OS module 822 is configured to manage hardware resource devices such as the I/O interfaces 810, the network interface 812, the I/O devices 814, and provide various services to applications or modules executing on the processors 804. The OS module 822 may implement a variant of the FreeBSD operating system as promulgated by the FreeBSD Project, other UNIX or UNIX-like variants, a variation of the Linux operating system as promulgated by Linus Torvalds, the Windows operating system from Microsoft Corporation of Redmond, Wash., FTOS from Dell, Inc. of Round Rock, Tex., IOS from Cisco Systems, Inc. of San Jose, Calif., or other operating system.

Also stored in the memory 820 may be a data store 824 and one or more of a communication module 826, the traffic module 832, the management module 118, or other modules 836. These modules may be executed as foreground applications, background tasks, daemons, and so forth. The data store 824 may use a flat file, database, linked list, tree, executable code, script, or other data structure to store information. In some implementations, the data store 824 or a portion of the data store 824 may be distributed across one or more other devices including the computing devices, network attached storage devices, and so forth.

The communication module 826 may be configured to establish connections with one or more of the connected devices 134, the server 126, or other devices. The communications may be authenticated, encrypted, and so forth. For example, the communication module 826 may be used to establish encrypted communication between the connected device 132 and the network device 116, between the intelligent jack 104 and the network device 116, and so forth.

The management module 118 may be stored in the memory 820. Operation of the management module 118 as described above. One or more of the port connection data 120, the port configuration data 122, the management data 124, and so forth may be stored in the data store 824.

During operation, the management module 118 may generate interrogation packets as described above. In some implementations, the interrogation packet may include an interrogation value 828. The interrogation value 828 may be used to authenticate the intelligent jack 104. Once authenticated, authentication data 830 may be generated and sent to one or more of the intelligent jack 104 or the connected device 132.

A traffic module 832 may be stored in the memory 820. The traffic module 832 may be configured to direct the transfer of packets of data between different physical ports 114 of the network device 116. The traffic module 832 may store traffic 834 in the data store 824 received at a first physical port 114(1), and then forward or send that traffic to a second physical port 114(2). Once forwarded, the traffic 834 may be removed from the data store 824. The traffic module 832 may operate at one or more levels of the OSI model. For example, the traffic module 832 may operate at layer 2 to perform the functions associated with a network switch, at layer 3 to perform functions associated with a network router, and so forth.

Other modules 836 may be stored in the memory 820. For example, the other modules 836 may include cryptographic modules, accounting modules, and so forth. Other data 838 may be stored in the data store 824. For example, cryptographic credentials used to encrypt a connection to the intelligent jack 104 or the connected device 132 may be stored in the data store 824.

The processes discussed herein may be implemented in hardware, software, or a combination thereof. In the context of software, the described operations represent computer executable instructions stored on one or more computer-readable storage media that, when executed by one or more processors, perform the recited operations. Generally, computer executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. An intelligent jack comprising:
a receptacle connector to couple to a patch cable;
a structured cabling connector to couple to a structured cable;
a network interface coupled to wiring extending between the structured cabling connector and the receptacle connector;
a memory, coupled to the network interface, the memory storing computer executable instructions; and
a processor, coupled to the memory, the processor accessing the computer executable instructions in the memory for execution of the computer executable instructions to:
send a jack identifier using the network interface, the jack identifier including a value uniquely identifying the intelligent jack.

2. The device of claim 1, the computer executable instructions further comprising instructions to:
receive an interrogation packet using the network interface;
determine an interrogation value from the interrogation packet;
access a seed value stored in the memory; and
generate the jack identifier based at least in part on the interrogation value and the seed value.

3. The device of claim 1, further comprising:
a power supply to obtain electrical power from the structured cable; and
wherein the jack identifier is sent as a data link layer frame responsive to one or more of:
power up of the device,
connection of a connected device to the receptacle connector,
disconnection of a connected device to the receptacle connector,
a predetermined time interval, or
an interrogation request received using the network interface.

4. The device of claim 1, further comprising:
a cryptographic module connected to one or more of the processor or the memory to generate at least a portion of authentication data; and
the computer executable instructions further comprising instructions to:
determine a connected device is connected to the receptacle connector;
determine the authentication data; and
send the authentication data to the connected device using the receptacle connector.

5. A system comprising:
an intelligent jack comprising:
a receptacle connector to couple to a cable;
a structured cabling connector to couple to a structured cable;
circuitry to send a jack identifier via the structured cable; and
a network device, coupled to wiring extending between the structured cabling connector and the receptacle connector, the network device comprising:
a network interface to provide communications using the structured cabling connector;
a memory storing the jack identifier and computer executable instructions; and
a processor, coupled to the memory, the processor accessing the computer executable instructions in the memory to execute the computer executable instructions to:
detect the jack identifier in the memory that identifies a physical port associated with the structured cable coupled to the structured cabling connector; and
generate port connection data that associates the jack identifier with the physical port.

6. The system of claim 5, the computer executable instructions further comprising instructions to:
determine port configuration data associated with the jack identifier; and
configure the physical port using the port configuration data associated with the jack identifier.

7. The system of claim 5, the computer executable instructions further comprising instructions to:
determine a change in the port connection data indicative of the jack identifier being detected at a different physical port; and
generate report data indicative of the change.

8. The system of claim 5, the computer executable instructions further comprising instructions to:
generate an interrogation signal; and
send the interrogation signal using the physical port; and
wherein the circuitry of the intelligent jack sends the jack identifier responsive to the interrogation signal.

9. The system of claim 5, the computer executable instructions further comprising instructions to:
- send, at a first time, a first cable ranging signal using the physical port;
- based at least in part on the first cable ranging signal, determine a first estimated cable distance of the cable between the network device and the intelligent jack;
- send, at a second time, a second cable ranging signal using the physical port;
- based at least in part on the second cable ranging signal, determine a second estimated cable distance of the cable between the network device and the intelligent jack;
- determine the first estimated cable distance and the second estimated cable distance differ by an amount exceeding a threshold value; and
- generate data indicative of a possible change in length of the cable.

10. A system comprising:
- an intelligent jack comprising:
  - a receptacle connector to couple to a cable;
  - a structured cabling connector to couple to a structured cable;
  - circuitry to send data via the structured cable; and
- a network device, coupled to wiring extending between the structured cabling connector and the receptacle connector, the network device comprising:
  - a network interface to provide communications using the structured cabling connector;
  - a memory storing a jack identifier, authentication data, and computer executable instructions; and
  - a processor, coupled to the memory, the processor accessing the computer executable instructions in the memory to execute the computer executable instructions to:
    - access the jack identifier and the authentication data; and
    - send the jack identifier and the authentication data via the structured cable to establish encrypted communication using the structured cable.

11. The system of claim 10, wherein the processor executes the computer executable instructions to:
- receive an interrogation packet using the network interface;
- determine an interrogation value from the interrogation packet;
- access a seed value stored in the memory; and
- generate the jack identifier based at least in part on the interrogation value and the seed value.

12. The system of claim 10, further comprising:
- a power supply to obtain electrical power from the structured cable; and
- wherein the jack identifier is sent as a data link layer frame responsive to one or more of:
  - power up of the network device,
  - connection of an external device to the receptacle connector,
  - disconnection of the external device to the receptacle connector,
  - a predetermined time interval, or
  - an interrogation request received using the network interface.

13. The system of claim 10, wherein the processor executes the computer executable instructions to:
- detect the jack identifier in the memory that identifies a physical port associated with a structured cable coupled to the structured cabling connector;
- generate port connection data that associates the jack identifier with the physical port; and
- send, via the structured cable, the jack identifier that identifies the physical port associated with the structured cable.

14. The system of claim 13, wherein the processor executes the computer executable instructions to:
- configure the physical port using the port configuration data associated with the jack identifier.

15. The system of claim 13, wherein the processor executes the computer executable instructions to:
- determine a change in the port connection data indicative of the jack identifier being detected at a different physical port; and
- generate report data indicative of the change.

16. The system of claim 13, wherein the processor executes the computer executable instructions to:
- access management data indicative of one or more of:
  - a network hostname of the network device, or
  - a network management address of the network device; and
- send data indicative of the port connection data and the management data to an external device.

17. The system of claim 10, wherein the processor executes the computer executable instructions to:
- receiving an interrogation signal; and
- responsive to the interrogation signal, send the jack identifier using the circuitry of the intelligent jack.

18. The system of claim 10, wherein the network device stores and forwards data between the receptacle connector and structured cabling connector based at least in part on a MAC address.

19. The system of claim 10, wherein the processor executes the computer executable instructions to:
- upon power up of the intelligent jack, send an announcement packet indicating the intelligent jack is ready for use.

20. The system of claim 10, wherein the processor executes the computer executable instructions to:
- receive a signal to activate diagnostic circuitry, wherein the diagnostic circuitry facilitates analysis of at least a portion of a cable.

* * * * *